United States Patent
Goralski et al.

[11] 3,895,010
[45] July 15, 1975

[54] 1-(ARYLTHIO)METHANESULFONAMIDES

[75] Inventors: Christian T. Goralski; Thomas C. Klingler, both of Midland, Mich.

[73] Assignee: The Dow Chemical Company, Midland, Mich.

[22] Filed: Dec. 13, 1972

[21] Appl. No.: 314,793

[52] U.S. Cl. 260/247.1 R; 260/268 S; 260/293.73; 260/326.5 S; 260/326.84; 260/556 A; 424/248; 424/250; 424/267; 424/274; 424/321

[51] Int. Cl. C07d 87/46; C07d 29/36; C07c 149/42

[58] Field of Search... 260/556 A, 247.1, 326.84, 260/293.73, 268 S

[56] References Cited
UNITED STATES PATENTS

| | | | |
|---|---|---|---|
| 3,086,974 | 4/1963 | Schlör et al. | 260/247.1 |
| 3,412,149 | 11/1968 | Schlör et al. | 260/556 A |
| 3,641,033 | 2/1972 | Levine | 260/294.8 F |

FOREIGN PATENTS OR APPLICATIONS

| | | | |
|---|---|---|---|
| 675,723 | 4/1939 | Germany | 260/556 A |

OTHER PUBLICATIONS

Morrison et al., "Organic Chemistry," (1970), pp. 756–757.

*Primary Examiner*—Anton H. Sutto
*Assistant Examiner*—Michael Shippen
*Attorney, Agent, or Firm*—Theodore Post; C. Kenneth Bjork

[57] ABSTRACT

This invention concerns 1-arylthiomethanesulfonamides of the formula

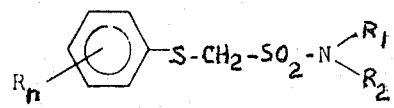

wherein R represents H, lower alkyl, lower alkoxy, halo or trifluoromethyl, $n$ represents an integer from zero to 3 and $R_1$ and $R_2$ independently represent H, lower alkyl or phenyl; or $R_1$ and $R_2$ together with the nitrogen atom form a heterocyclic group or a lower alkyl- or phenyl-substituted heterocyclic group which may contain another nitrogen or an oxygen hetero atom. The compounds are prepared by reacting a halomethanesulfonamide with an alkali metal salt of a thiophenol. The compounds have antimicrobial activity.

12 Claims, No Drawings

1-(ARYLTHIO)METHANESULFONAMIDES

SUMMARY OF THE INVENTION

This invention concerns 1-(arylthio)methanesulfonamides corresponding to the formula

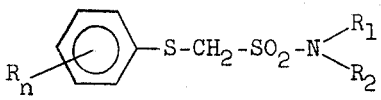

wherein R represents H, lower alkyl, lower alkoxy, halo or trifluoromethyl, $n$ represents an integer from zero to 3 and $R_1$ and $R_2$ independently represent H, lower alkyl or phenyl; or $R_1$ and $R_2$ together with the nitrogen atom form a heterocyclic group or a lower alkyl- or phenyl-substituted heterocyclic group which contains up to one other hetero atom of the group consisting of oxygen and nitrogen, such as, for example, a pyrrolidinyl, piperidinyl, piperazinyl, morpholinyl, 4-lower alkyl-piperazinyl or a 4-phenylpiperidinyl group. In the specification and claims, "lower alkyl" and "lower alkoxy" designate a 1 to 6 carbon straight or branched chain alkyl or alkoxy group, such as, for example, methyl, ethyl, propyl, isopropyl, butyl, isobutyl, secondary butyl, tertiary butyl, n-pentyl or n-hexyl; or the corresponding alkoxy group, respectively. The term "halo" designates fluoro, chloro or bromo. The compounds have antimicrobial activity.

The compounds are prepared by reacting a corresponding α-halomethanesulfonamide with an alkali metal salt of a corresponding thiophenol. The reaction is advantageously carried out in the presence of an appropriate polar organic solvent, such as, for example, methanol, ethanol or dimethylformamide as reaction medium. The reaction is carried out at a temperature at which alkali metal halide of reaction is formed, advantageously at a temperature ranging between about 25° and about 80°C.

In carrying out the reaction, an excess of the alkali metal salt of the thiophenol is used, advantageously in about 2 molar proportions per molar proportion of the halomethanesulfonamide. In the reaction, the sodium or potassium salt of the thiophenol is advantageously used. Of the halomethanesulfonamides, the chloro, bromo or iodo species are advantageously used. The progress of the reaction may be followed by monitoring the byproduct alkali metal halide.

The reaction product is separated and recovered from the reaction medium by removing the solvent, advantageously in vacuo, washing the residue with water and recrystallizing the product from an appropriate organic solvent, advantageously a benzene/hexane mixture, methanol, or ethanol, as appropriate. The product is identified by elemental analysis and by nuclear magnetic resonance spectroscopy (nmr).

In practice, the alkali metal salt of the thiophenol, advantageously formed in situ from the corresponding benzenethiol and alkali metal in methanol or ethanol is prepared and to it is added the halomethanesulfonamide, and the solution is refluxed to completion or substantial completion of the reaction. Solvent is then removed in vacuo and the product washed by stirring with water, the product then being filtered off and recrystallized from a suitable organic solvent such as, for example, a benzene/hexane mixture, methanol or ethanol.

DESCRIPTION OF SOME PREFERRED EMBODIMENTS

The following examples describe representative specific embodiments and the best mode contemplated by the inventors of carrying out the invention. Temperature is given in centigrade degrees. The compounds are identified by elemental analysis and/or nuclear magnetic resonance spectroscopy.

EXAMPLE 1

N,N-Dimethyl-1-(phenylthio)methanesulfonamide

To a solution of 4.6 g. (0.2 mol) of sodium in 500 ml. of methanol is added 22 g. (0.2 mol) of benzenethiol with stirring. Then 20.2 g. (0.1 mol) of 1-bromo-N,N-(dimethyl)methanesulfonamide is added and the solution refluxed for 13 hours. The solvent is removed in vacuo and the residue mixed with 250 ml. of water. The product is filtered off and recrystallized from benzene/hexane to give 20.14 g. (87% yield) of fluffy white crystals, m.p. 71°–72°C.

Anal. Calcd. for $C_9H_{13}NO_2S_2$: C, 46.73; H, 5.66; N, 6.05; S, 27.72. Found: C, 46.58; H, 5.65; N, 6.18; S, 27.74.

EXAMPLE 2

1-Methyl-4-(((phenylthio)methyl)sulfonyl)piperazine

To a solution of 5.3 g. (0.228 mol) of sodium in 500 ml. of methanol is added 25 g. (0.228 mol) of benzenethiol. The system is flushed with dry nitrogen and 30 g. (0.117 mol) of 1-((bromomethyl)sulfonyl)-4-(methyl)piperazine added. After refluxing for 13 hours, the solvent is removed in vacuo and the product stirred with 500 ml. of aqueous 10% HCl. The mixture is filtered and the solution neutralized with sodium hydroxide. The product is filtered off and the solution extracted with methylene chloride. The organic phase is dried over $Na_2SO_4$, filtered and the solvent removed to give additional product. Recrystallization from benzene/hexane gives 14.7 g. (44% yield) of white platelets, m.p. 123°–124°C.

Anal. Calcd. for $C_{12}H_{18}N_2O_2S_2$: C, 50.32; H, 6.34; N, 9.78; S, 22.39. Found: C, 50.24; H, 6.50; N, 9.78; S, 22.14.

EXAMPLE 3

Pursuant to the procedure of Example 1, the following compounds were prepared.

TABLE I 1-(Arylthio)methanesulfonamides

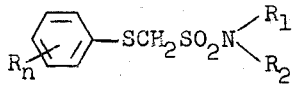

| | $R_n$ | $NR_1R_2$ | m.p.,°C. | Calcd. C | H | N | S | Found C | H | N | S |
|---|---|---|---|---|---|---|---|---|---|---|---|
| a) | 4—$CH_3$ | $NH_2$ | 122–124 | 44.22 | 5.10 | 6.44 | 29.51 | 44.25 | 5.02 | 6.44 | 29.33 |
| b) | 4—Br[a] | $NH_2$ | 140–140.5 | 29.79 | 2.86 | 4.96 | 22.73 | 29.55 | 3.00 | 5.13 | 23.05 |
| c) | 4—$CH_3O$ | $N(CH_3)_2$ | 65.5–67 | 45.95 | 5.78 | 5.35 | 24.54 | 45.86 | 5.86 | 5.57 | 24.90 |
| d) | H |  | 118–120 | 48.33 | 5.53 | 5.12 | 23.46 | 48.26 | 5.51 | 5.29 | 23.52 |
| e) | 4—Cl[b] |  | 143–144.5[c] | 42.92 | 4.58 | 4.55 | 20.83 | 43.39 | 4.55 | 4.66 | 21.50 |
| f) | 4—$(CH_3)_3$[c] |  | 68–70 | 58.68 | 7.69 | 4.27 | 19.58 | 58.68 | 7.50 | 4.32 | 19.52 |
| g) | H | NH—  | 75–77 | 55.89 | 4.69 | 5.01 | 22.96 | 54.98 | 4.49 | 5.01 | 22.86 |
| h) | H |  | 109.5–110.5 | 62.21 | 6.09 | 4.03 | 18.45 | 62.26 | 6.17 | 4.19 | 18.36 |
| i) | 3,4—$Cl_2$[d] | $N(CH_3)C_6H_5$ | 87–89 | 46.41 | 3.62 | 3.86 | 17.70 | 45.99 | 3.55 | 4.01 | 18.07 |
| j) | 3,4—$Cl_2$[e] | $NH_2$ | 102–104 | 30.89 | 2.59 | 5.14 | 23.56 | 30.75 | 2.70 | 5.00 | 23.76 |
| k) | 3—$CF_3$ | $NH_2$ | 76–77 | 35.42 | 2.97 | 5.16 | 23.64 | 35.36 | 3.13 | 5.05 | — |
| l) | 2,4,5—$Cl_3$[f] | $NH_2$ | 159–161 | 27.42 | 1.97 | 4.57 | 20.92 | 27.61 | 2.02 | 4.55 | 21.20 |

[a] Bromine analysis. Calcd. for $C_7H_8BrNO_2S_2$: Br, 28.32. Found: Br, 28.50
[b] Chlorine analysis. Calcd. for $C_{11}H_{14}ClNO_3S_2$: Cl, 11.51. Found: Cl, 11.51, 11.57
[c] This material contained approximately 8% of the 2-chloro (ortho chloro) isomer.
[d] Chlorine analysis. Calcd. for $C_{14}H_{13}Cl_2NO_2S_2$: Cl, 19.57. Found: Cl, 19.40
[e] Chlorine analysis. Calcd. for $C_7H_7Cl_2NO_2S_2$: Cl, 26.05. Found: Cl, 26.00
[f] Chlorine analysis. Calcd. for $C_7H_6Cl_3NO_2S_2$: Cl, 34.69. Found: Cl, 34.50.

The compounds of the invention are employed as antimicrobials for the control of bacteria, fungi and yeasts. For such uses, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to product the ultimate treating compositions. Good results are obtained when employing compositions containing antimicrobial concentrations and usually from about 25 to 10,000 parts by weight of one or more of the compounds per million parts of such composition.

In representative operations, compounds of the present invention were tested for their activity as antimicrobials using conventional agar dilution tests. The following Table presents results, expressed as percent growth inhibition (numerator) over concentration of toxicant in parts per million (denominator).

TABLE II

| Example | Cf | Tm | T | Bs | Ci | Sa | At | Cp | Pp | Mp |
|---|---|---|---|---|---|---|---|---|---|---|
| 1 | | 100<br>500 | 100<br>500 | 100<br>500 | 100<br>500 | | | | | |
| 2 | 100<br>500 | | | | | | | | | |
| 3a | | 100<br>500 | 50<br>500 | | | | | | | |
| 3b | | 100<br>500 | | | 100<br>500 | | | | | |
| 3c | | 100<br>500 | 100<br>500 | | | | | | | |
| 3g | | 100<br>500 | | | | | | | | |
| 3j | | 100<br>500 | 100<br>500 | 100<br>500 | 100<br>500 | 100<br>500 | 100<br>500 | 100<br>500 | 100<br>500 | 100<br>100 |
| 3k | | 100<br>500 | 100<br>500 | 100<br>500 | | | | 100<br>500 | | 100<br>100 |
| Controls: no growth inhibition | | | | | | | | | | |

Cf = *Cephaloascus fragans*
Tm = *Trichophton mentagrophytes*
T = *Trichoderma species*
Bs = *Bacillus subtilis*
Ci = *Ceratocystis ips*
Sa = *Staphylococcus aureus*
At = *Aspergillus terreus*
Cp = *Candida pelliculosa*
Pp = *Pullularia pullulans*
Mp = *Mycobacterium phlei*

The compounds of this invention, when brominated to give the corresponding dibromomethanesulfonamide derivatives, provide compounds having antimicrobial activity.

What is claimed is:

1. A 1-(arylthio)methanesulfonamide selected from the group consisting of N,N-dimethyl-1-(phenylthio)-methanesulfonamide; 1-methyl-4-(((phenylthio)methyl)sulfonyl)piperazine; 1-((p-bromophenyl)thio)methanesulfonamide; 1-((p-methoxyphenyl)thio)-N,N-dimethyl methanesulfonamide; 4-(((phenylthio)methyl)sulfonyl)morpholine; 4-((((p-chlorophenyl)thio)methyl)sulfonyl)morpholine; 1-((((p-t-butylphenyl)thio)methyl)sulfonyl)piperidine; 4-phenyl-1-(((phenylthio)methyl)sulfonyl)piperidine; 1-((3,4-dichlorophenyl)thio)methanesulfonamide; 1-((3-(trifluoromethyl)phenyl)thio)methanesulfonamide; and 1-((2,4,5-trichlorophenyl)thio)methanesulfonamide.

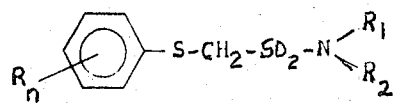

wherein R represents H, loweralkyl, lower alkoxy, halo or trifluoromethyl, n represents an integer from zero to 3 and 2. The compound of claim 1 which is N,N-dimethyl-1-(phenylthio)methanesulfonamide.

3. The compound of claim 1 which is 1-methyl-4-(((phenylthio)methyl)sulfonyl)piperazine.

4. The compound of claim 1 which is 1-((p-bromophenyl)thio)methanesulfonamide.

5. The compound of claim 1 which is 1-((p-methoxyphenyl)thio)-N,N-dimethyl methanesulfonamide.

6. The compound of claim 1 which is 4-(((phenylthio)methyl)sulfonyl)morpholine.

7. The compound of claim 1 which is 4-((((p-chlorophenyl)thio)methyl)sulfonyl)morpholine.

8. The compound of claim 1 which is 1-((((p-t-butylphenyl)thio)methyl)sulfonyl)piperidine.

9. The compound of claim 1 which is 4-phenyl-1-(((phenylthio)methyl)sulfonyl)piperidine.

10. The compound of claim 1 which is 1-((3,4-dichlorophenyl)thio)methanesulfonamide.

11. The compound of claim 1 which is 1-((3-(trifluoromethyl)phenyl)thio)methanesulfonamide.

12. The compound of claim 1 which is 1-((2,4,5-trichlorophenyl)thio)methanesulfonamide.

* * * * *

UNITED STATES PATENT OFFICE
CERTIFICATE OF CORRECTION

Patent No. 3,895,010                     Dated  July 15, 1975

Inventor(s)  Christian T. Goralski et al.        Page 1 of 2

It is certified that error appears in the above-identified patent and that said Letters Patent are hereby corrected as shown below:

Column 3, Table 1, under subheading $R_n$, (item f), "4--$(CH_3)_3C$" should read --4--$(CH_3)_3C$--;

Columns 3 & 4, Table II, in the footnotes of table, second item, "Tm = Trichophton mentagrophytes", should read --Tm = Trichophyton mentagrophytes--;

Column 5, claim 1, lines 20 through 27 delete;

Column 6, claim 1, lines 1 and 2 delete.

Columns 3 and 4, Table II should read as shown on the attached sheet.

Signed and Sealed this sixth Day of April 1976

[SEAL]

Attest:

RUTH C. MASON  
Attesting Officer

C. MARSHALL DANN  
Commissioner of Patents and Trademarks

TABLE II

| Example | Cf | Tm | T | Bs | Ci | Sa | At | Cp | Pp | Mp |
|---|---|---|---|---|---|---|---|---|---|---|
| 1 |  | $\frac{100}{500}$ | $\frac{100}{500}$ | $\frac{100}{500}$ | $\frac{100}{500}$ |  |  |  |  |  |
| 2 | $\frac{100}{500}$ |  |  |  |  |  |  |  |  |  |
| 3a |  | $\frac{100}{500}$ | $\frac{50}{500}$ |  |  |  |  |  |  |  |
| 3b |  | $\frac{100}{500}$ |  | $\frac{100}{500}$ |  |  |  |  |  |  |
| 3c |  | $\frac{100}{500}$ | $\frac{100}{500}$ |  |  |  |  |  |  |  |
| 3g |  | $\frac{100}{500}$ |  |  |  |  |  |  |  |  |
| 3j |  | $\frac{100}{500}$ | $\frac{100}{500}$ | $\frac{100}{500}$ | $\frac{100}{500}$ | $\frac{100}{500}$ | $\frac{100}{500}$ | $\frac{100}{500}$ | $\frac{100}{500}$ | $\frac{100}{100}$ |
| 3k |  | $\frac{100}{500}$ | $\frac{100}{500}$ | $\frac{100}{500}$ |  |  |  | $\frac{100}{500}$ |  | $\frac{100}{100}$ |
| Controls: no growth inhibition |